(12) United States Patent
Inoue et al.

(10) Patent No.: US 11,597,093 B2
(45) Date of Patent: Mar. 7, 2023

(54) CALIBRATION METHOD FOR LASER PROCESSING ROBOT

(71) Applicant: FANUC CORPORATION, Yamanashi (JP)

(72) Inventors: Toshihiko Inoue, Yamanashi (JP); Toshikatsu Kuroki, Yamanashi (JP); Naoki Fujioka, Yamanashi (JP); Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 688 days.

(21) Appl. No.: 16/590,838

(22) Filed: Oct. 2, 2019

(65) Prior Publication Data

US 2020/0130191 A1 Apr. 30, 2020

(30) Foreign Application Priority Data

Oct. 24, 2018 (JP) .............................. JP2018-199859

(51) Int. Cl.
*B25J 9/16* (2006.01)
*B23K 26/03* (2006.01)
(Continued)

(52) U.S. Cl.
CPC ........... *B25J 9/1692* (2013.01); *B23K 26/032* (2013.01); *B23K 26/082* (2015.10); *B23K 26/0884* (2013.01)

(58) Field of Classification Search
None
See application file for complete search history.

(56) References Cited

U.S. PATENT DOCUMENTS

2006/0037951 A1 2/2006 Otsuka et al.

FOREIGN PATENT DOCUMENTS

| CN | 108106535 A1 * | 6/2018 | ........... G01B 11/002 |
| EP | 1629933 A2 | 3/2009 | |

(Continued)

OTHER PUBLICATIONS

Machine translation of CN 108106535 A1 performed on May 4, 2022, Song et al. (Year: 2018).*

(Continued)

*Primary Examiner* — Brian W Jennison
*Assistant Examiner* — Kevin Guanhua Wen
(74) *Attorney, Agent, or Firm* — Maier & Maier, PLLC

(57) ABSTRACT

A calibration method for a laser processing robot, including: fixing a jig that includes a target-site to a base of the laser processing robot; placing a laser processing tool at a position where a laser beam is scanned with respect to the target-site, the laser processing tool having a function for two-dimensionally scanning the laser beam and a function for receiving the laser beam reflected at an object and for measuring a distance to the object; measuring distances to respective portions of the target-site by scanning the laser beam; calculating a coordinate transformation function for converting a position and orientation of the target-site, which is obtained based on the measured distances to the respective portions of the target-site, into an actual position and orientation of the target-site; and correcting a tool-center-point of the laser processing tool by the coordinate transformation function.

6 Claims, 5 Drawing Sheets

(51) Int. Cl.
*B23K 26/082* (2014.01)
*B23K 26/08* (2014.01)

(56) References Cited

FOREIGN PATENT DOCUMENTS

| JP | H08211921 | A |   | 8/1996 |         |
|----|-----------|---|---|--------|---------|
| JP | H11156578 | A |   | 6/1999 |         |
| JP | 3352373   | B2|   | 12/2002|         |
| JP | 200655901 | A |   | 3/2006 |         |
| JP | 2011-177845| A|   | 9/2011 |         |
| JP | 2011177845| A1| * | 9/2011 | B25J 9/10 |
| JP | 2011-235400| A|   | 11/2011|         |
| JP | 2012-135781| A|   | 7/2012 |         |
| JP | 2013126670| A |   | 6/2013 |         |
| JP | 2015-062991| A|   | 4/2015 |         |
| JP | 2015062991| A1| * | 4/2015 | B25J 13/08 |
| JP | 5741417   | B2|   | 7/2015 |         |
| JP | 2016052695| A1| * | 4/2016 | B25J 9/1692 |
| JP | 2017100138| A |   | 6/2017 |         |
| JP | 2018094648| A | * | 6/2018 | B25J 9/16 |

OTHER PUBLICATIONS

Machine translation of JP 2011177845 A1 performed on May 4, 2022, Maruyama (Year: 2011).*
Machine translation of JP 2015062991 A1 performed on May 4, 2022, Amano (Year: 2015).*
Machine translation of JP 2016052695 A1 performed on May 4, 2022, Suzuki (Year: 2016).*
Machine translation of JP 2018094648 A performed on Sep. 7, 2022, Kobayashi (Year: 2018).*
Japanese Office Action dated Aug. 18, 2020 in corresponding Japanese application No. JP 2018-199859.

* cited by examiner

CALIBRATION METHOD FOR LASER PROCESSING ROBOT

CROSS-REFERENCE TO RELATED APPLICATIONS

This application is based on Japanese Patent Application No. 2018-199859, the contents of which are incorporated herein by reference.

FIELD

The present invention relates to a calibration method for a laser processing robot.

BACKGROUND

In the related art, there is a known calibration method for a laser processing robot having an additional axis (for example, see Japanese Unexamined Patent Application, Publication No. 2006-55901).

With the calibration method in Japanese Unexamined Patent Application, Publication No. 2006-55901, calibration is performed by operating a robot including an additional axis to actually move a processing tool.

SUMMARY

An aspect of the present invention is a calibration method for a laser processing robot including a base that is fixed on an installation surface and a movable portion that is movable with respect to the base, wherein a laser processing tool is mounted at a distal end thereof, said method including: fixing a measurement jig that includes a measurement target site having a prescribed shape to the base; providing the laser processing tool with a function for two-dimensionally scanning a measurement laser beam, and also a distance measuring function for receiving the measurement laser beam reflected at an object and for measuring a distance to the object; placing the laser processing tool, by operating the laser processing robot, at a position where the measurement laser beam can be scanned with respect to the measurement target site; measuring distances to respective portions of the measurement target site by scanning the measurement laser beam at the measurement target site; calculating a coordinate transformation function for converting a position and orientation of the measurement target site, which can be obtained on the basis of the measured distances to the respective portions of the measurement target site, into an actual position and orientation of the measurement target site; and correcting a tool center point of the laser processing tool by using the calculated coordinate transformation function.

DETAILED DESCRIPTION

A calibration method for a laser processing robot 1 according to an embodiment of the present invention will be described below with reference to the drawings.

Figure 1:
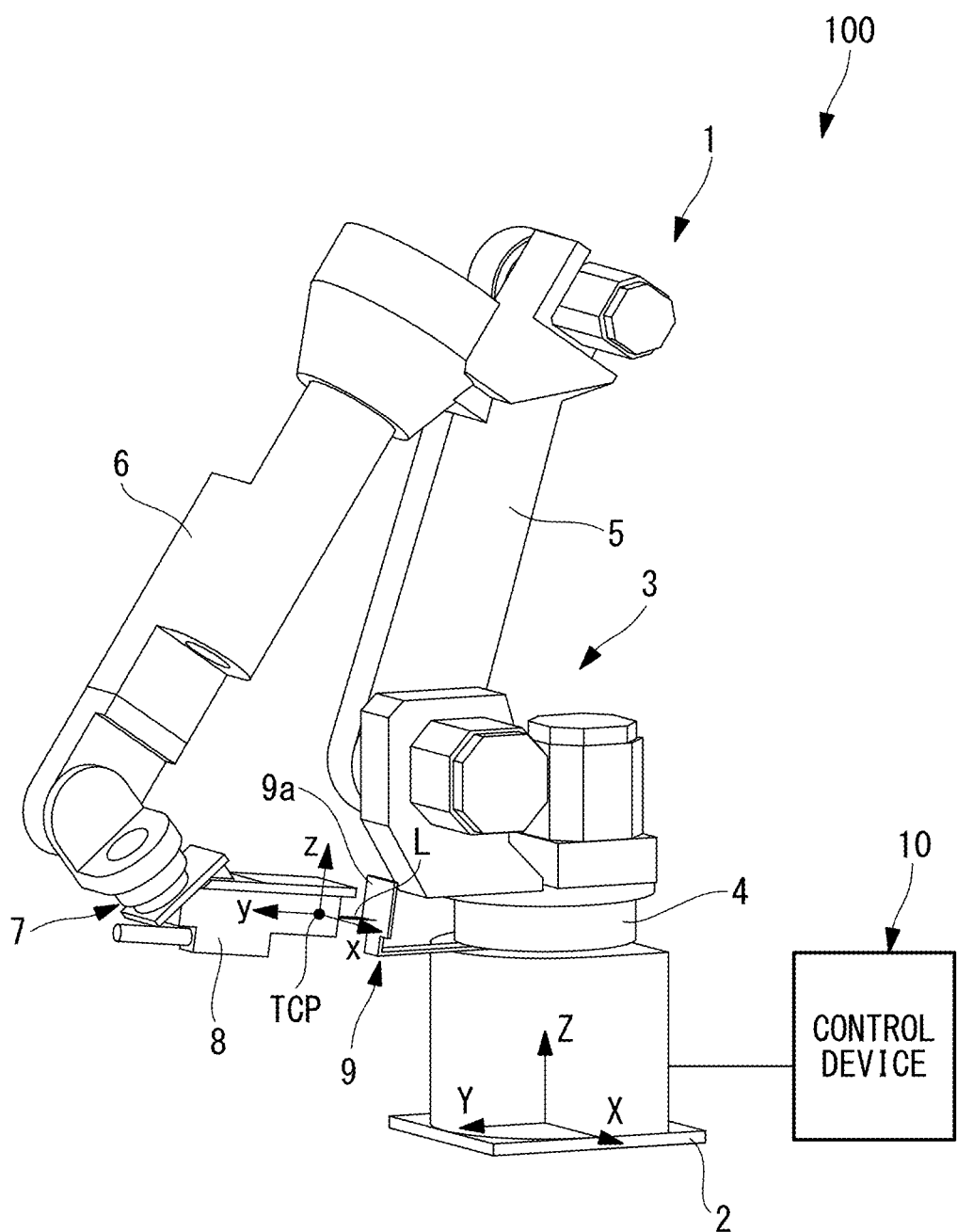
FIG. 1 is an overall configuration diagram showing a robot system used in a calibration method for a laser processing robot according to an embodiment of the present invention.

As shown in FIG. 1, a robot system 100 used in the calibration method according to this embodiment includes the laser processing robot 1 and a control device 10 that controls the laser processing robot 1.

The laser processing robot 1 is, for example, a six-axis articulated robot and includes: a base 2 that is fixed on a floor surface (installation surface); and a movable portion 3 that operates with respect to the base 2. The laser processing robot 1 has, for example, a robot coordinate system XYZ that is fixed with respect to the base 2.

The movable portion 3 includes, for example: a revolving drum 4 that rotates about a vertical, first axis with respect to the base 2; a first arm 5 that rotates about a horizontal, second axis with respect to the revolving drum 4; a second arm 6 that rotates about a horizontal, third axis with respect to the first arm 5; and a three-axis wrist unit 7 that is provided at a distal end of the second arm 6.

In the laser processing robot 1, a laser processing tool 8 is mounted at a distal end of the three-axis wrist unit 7, and a measurement jig 9 is fixed to the base 2. The laser processing tool 8 can output a processing laser beam and, separately from the processing laser beam, a teaching laser beam (measurement laser beam) L.

Figure 2:
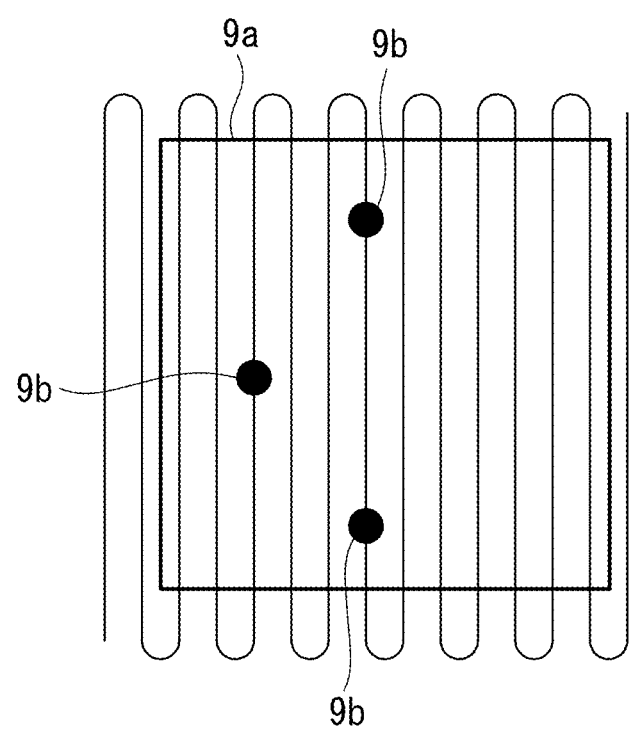
FIG. 2 is a diagram showing an example of a measurement target site of a measurement jig provided in the robot system in FIG. 1 and an example of a scanning trajectory of a laser beam scanned by a laser processing tool.

The laser processing tool 8 is provided with: a function for two-dimensionally scanning the teaching laser beam L, for example, with a raster scanning method, as with the trajectory shown in FIG. 2; and a distance measuring function for receiving light reflected at scanning positions and returning from an object and for measuring distances to the object, based on a tool coordinate system xyz that is set at a tool center point TCP.

The measurement jig 9 includes a measurement target site 9a that is disposed at a position substantially facing the laser processing tool 8, when the laser processing robot 1 is operated so as to achieve the posture shown in FIG. 1 and the posture of the laser processing tool 8 is set. In the example shown in FIGS. 1 and 2, the measurement target site 9a is a planar portion comprising a square plane and, as shown in FIG. 2, includes, at three locations, holes (shape recognizing portions) 9b that penetrate therethrough in a plate thickness direction. The holes 9b are disposed at three locations with gaps therebetween, at asymmetrical positions in the plane constituting the measurement target site 9a.

By fixing the measurement jig 9 to the base 2, the measurement target site 9a is disposed at a location precisely positioned in the robot coordinate system XYZ. With this configuration, the actual position and orientation of the measurement target site 9a, in the robot coordinate system XYZ, are known.

Figure 3:
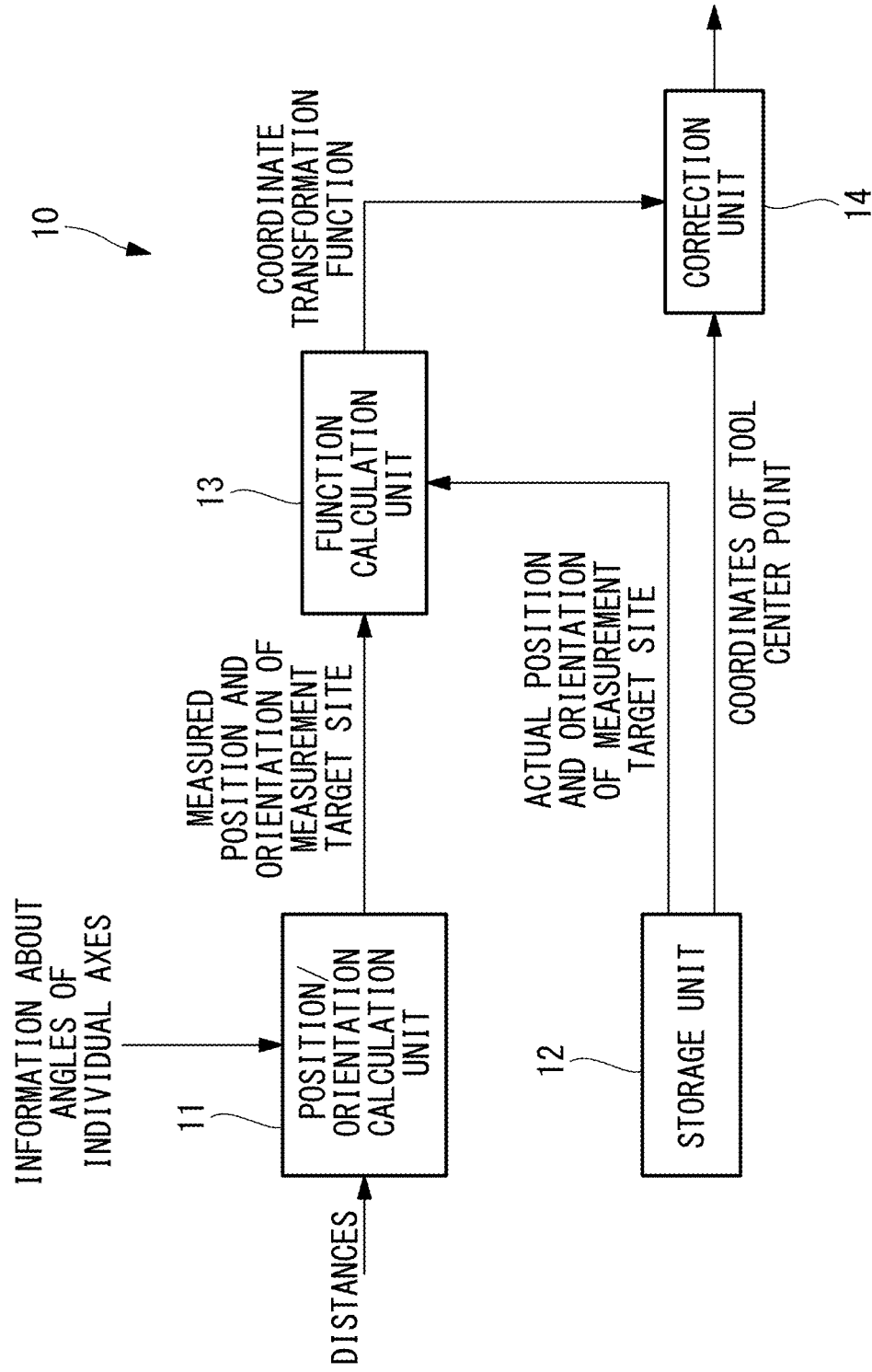
FIG. 3 is a functional block diagram showing portions involved in calibration in a control device provided in the robot system in FIG. 1.

As shown in FIG. 3, the control device 10 includes: a position/orientation calculation unit 11 that calculates the measured position and orientation of the measurement target site 9a on the basis of information about the distances to the respective portions of the measurement target site 9a, measured by the laser processing tool 8, and information about the angles of the individual axes of the laser processing robot 1; a storage unit 12 that stores the coordinates of the tool center point TCP of the laser processing tool 8, in the robot coordinate system XYZ shown in FIG. 1, as well as the actual position and orientation of the measurement target site 9a of the measurement jig 9; a function calculation unit 13 that calculates a coordinate transformation function for matching the measured position and orientation of the measurement target site 9a with the actual position and orientation of the measurement target site 9a; and a correction unit 14 that corrects the stored tool center point TCP of the laser processing tool 8 by using the calculated coordinate transformation function.

The function calculation unit 13 can obtain, as a coordinate transformation function, a positional relationship between objects having a similar shape by employing a publicly known method, such as ICP matching.

The calibration method for the laser processing robot 1 according to this embodiment will be described below.

Figure 4:
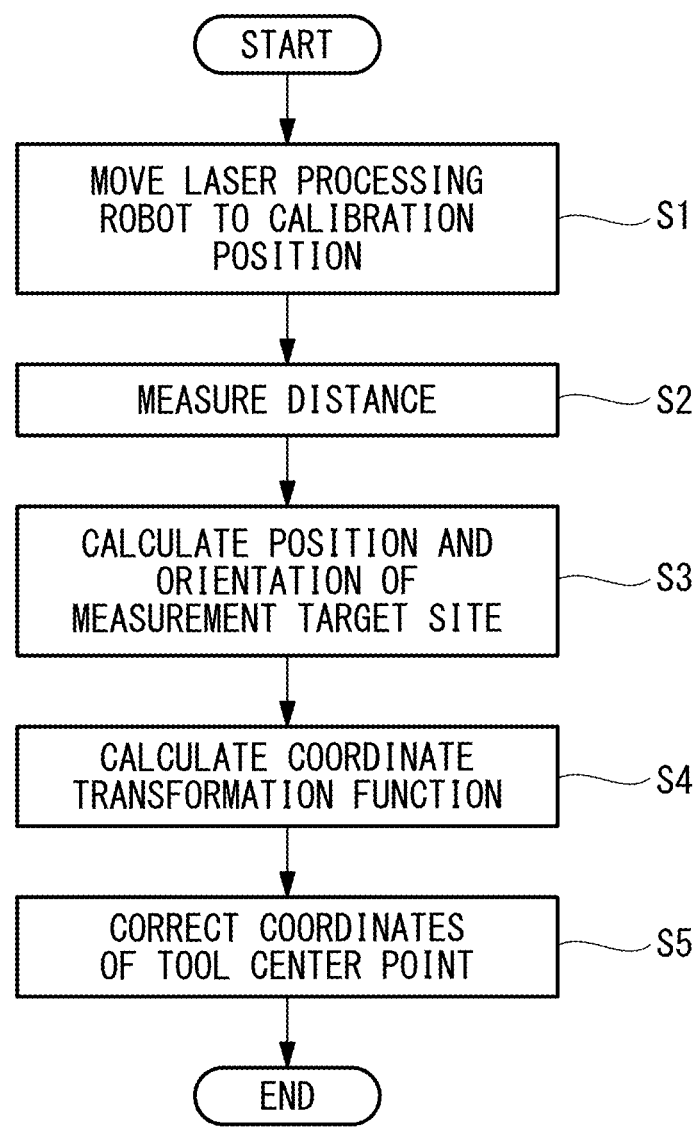
FIG. 4 is a flowchart showing the calibration method for the laser processing robot in FIG. 1.

In the calibration method for the laser processing robot 1 according to this embodiment, as shown in FIG. 4, the laser processing robot 1 is first operated automatically by the control device 10 or operated by a worker using a teaching operation panel, and is moved to the calibration position shown in FIG. 1 (step S1). The calibration position need not be an exact position and may be an approximate position where the laser beam emitted from the laser processing tool 8 can be scanned at the measurement target site 9a of the measurement jig 9.

Figure 5:
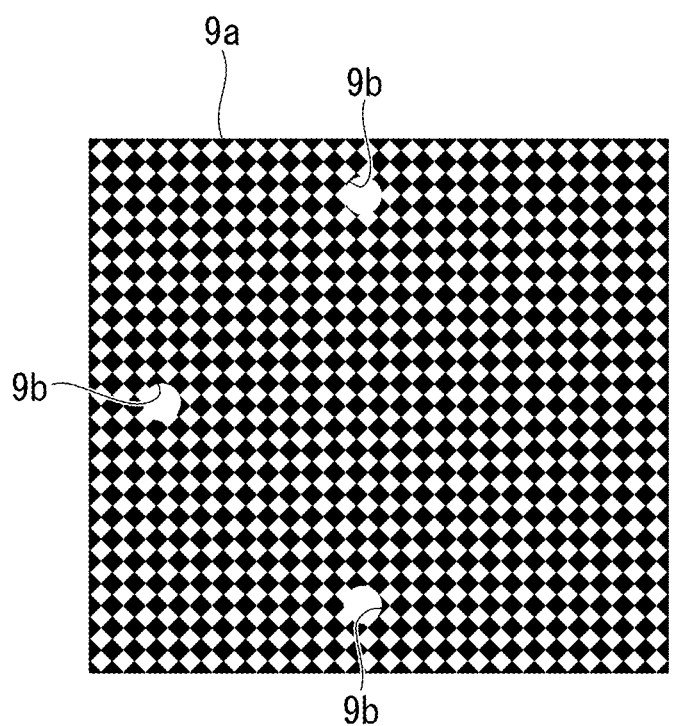
FIG. 5 is a diagram showing an example of a point group obtained by means of a distance measuring function of the laser processing tool of the robot system in FIG. 1.

Next, the teaching laser beam L is emitted from the laser processing tool 8 and, as shown in FIG. 2, is two-dimensionally scanned at the measurement target site 9a, the light reflected at each position on the scanning path and returning from the measurement target site 9a is received, and the distances to the respective portions of the measurement target site 9a, in the tool coordinate system xyz shown in FIG. 1, are measured (step S2). The coordinates of the positions irradiated with the teaching laser beam L are determined on the basis of the angles of a galvanometer mirror (not shown) of the laser processing tool 8. Therefore, by storing the coordinates and the measured distances in association with each other, as shown in FIG. 5, it is possible to obtain a point group having information about the distances from the laser processing tool 8, measured at the respective portions of the planar shape serving as the measurement target site 9a.

When the information about the obtained point group is sent to the control device 10, the information about the angles of the individual axes of the laser processing robot 1 at the time of measurement is sent to the position/orientation calculation unit 11 in the control device 10, and the measured position and orientation of the measurement target site 9a, in the robot coordinate system XYZ shown in FIG. 1, are calculated (step S3). The calculated position and orientation of the measurement target site 9a, which are obtained on the basis of the measured distances, and the actual position and orientation of the measurement target site 9a, which are stored in the storage unit 12, are sent to the function calculation unit 13, and the coordinate transformation function is calculated (step S4).

Then, when the calculated coordinate transformation function and the coordinates of the tool center point TCP, which are stored in the storage unit 12, are sent to the correction unit 14, the coordinates of the tool center point TCP are applied by the coordinate transformation function, to correct the coordinates of the tool center point TCP (step S5).

As described above, with the calibration method for the laser processing robot 1 according to this embodiment, it is possible to perform calibration without precisely positioning the laser processing tool 8 with respect to the measurement jig 9. As a result, the present invention affords an advantage in that it is possible to eliminate the work that has been required for precisely positioning the laser processing tool 8, thereby reducing the time required for the calibration work.

With the calibration method for the laser processing robot 1 according to this embodiment, the square plane is employed as the measurement target site 9a of the measurement jig 9; thus, there is an advantage in that a simple configuration can be achieved and that the coordinate transformation function can be easily calculated. Although the plane having a symmetrical shape is used, an asymmetrical shape can be achieved by including the holes 9b at three locations; thus, there is an advantage in that a rotating direction can be easily calculated when the coordinate transformation function is calculated.

Although the square plane in which the holes 9b are asymmetrically provided is employed as the measurement target site 9a in this embodiment, alternatively, a measurement target site 9a having another arbitrary shape may be employed. For example, without limitation to a plane, any solid having a spherical shape, a cone shape, a cuboid shape or the like may be employed. In a case in which a plane is employed, an arbitrary shape, such as a polygon that is not rotationally symmetric, may be employed.

A retroreflective material may be applied to or coated on the measurement target site 9a so as to increase the intensity of the reflected light received by the laser processing tool 8, and a region in which the reflected light having an intensity exceeding a prescribed threshold is detected may be extracted as the measurement target site 9a. By doing so, it is possible to facilitate the extraction of the measurement target site 9a.

Although the processing laser beam and the teaching laser beam have been illustrated as examples of the laser beam that can be output by the laser processing tool 8 in this embodiment, alternatively, a distance-measuring laser beam guided coaxially with the processing laser beam of the laser processing tool 8 may be output, and a method using the distance-measuring laser beam may be employed.

Although the laser processing tool 8 having the built-in galvanometer mirror has been illustrated as an example in this embodiment, the invention is not limited thereto. It is permissible to employ any tool that can arbitrarily change the irradiation path of the laser beam, for example, a tool formed of a prism or the like.

Although the laser processing tool 8 having the built-in galvanometer mirror has been described in this embodiment, in a case in which the laser processing tool 8 does not have a function capable of changing the irradiation direction of the laser beam, a method in which scanning is performed by changing the posture of the laser processing tool 8 by means of the laser processing robot 1 may be employed.

As a result, the following aspect is derived from the above described embodiment.

An aspect of the present invention is a calibration method for a laser processing robot including a base that is fixed on an installation surface and a movable portion that is movable with respect to the base, wherein a laser processing tool is mounted at a distal end thereof, said method including: fixing a measurement jig that includes a measurement target site having a prescribed shape to the base; providing the laser processing tool with a function for two-dimensionally scanning a measurement laser beam, and also a distance measuring function for receiving the measurement laser beam reflected at an object and for measuring a distance to the object; placing the laser processing tool, by operating the laser processing robot, at a position where the measurement laser beam can be scanned with respect to the measurement target site; measuring distances to respective portions of the measurement target site by scanning the measurement laser beam at the measurement target site; calculating a coordinate transformation function for converting a position and orientation of the measurement target site, which can be obtained on the basis of the measured distances to the respective portions of the measurement target site, into an actual position and orientation of the measurement target site; and correcting a tool center point of the laser processing tool by using the calculated coordinate transformation function.

With this aspect, the laser processing robot is operated to place the laser processing tool, which is mounted at the distal end thereof, at the position where the measurement target site of the measurement jig attached to the base can be irradiated with the measurement laser beam from the laser processing tool, the measurement laser beam is emitted from the laser processing tool, and the measurement laser beam is two-dimensionally scanned at the measurement target site. By doing so, the laser processing tool receives the reflected light from the respective portions of the measurement target site, and it is possible to measure the distances between the laser processing tool and the respective portions of the measurement target site by means of the distance measuring function of the laser processing tool.

Meanwhile, because the angles of individual axes of the laser processing robot are known at the time of measurement, it is possible to calculate the position and orientation of the measurement target site, based on the coordinate system of the robot, from the measured distances to the measurement target site. Because the measurement jig is fixed to the base of the robot, the actual position and orientation of the measurement target site, based on the coordinate system of the robot, are known.

In a case in which the actual tool center point of the laser processing tool coincides with the tool center point recognized by a control device for the laser processing robot, the calculated position and orientation of the measurement target site match the actual position and orientation of the measurement target site; however, there are some cases where individual differences cause a mismatch, for example, when the laser processing tool is replaced. In such a case, it is possible to eliminate deviation of the tool center point by calculating the coordinate transformation function for converting the calculated position and orientation of the measurement target site into the actual position and orientation of the measurement target site, and correcting the tool center point recognized by the control device by using the calculated coordinate transformation function.

In other words, it is possible to perform calibration of the tool center point without accurately aligning the laser processing tool with respect to the measurement jig, and to reduce the time required for calibration, for example, in the case in which the laser processing tool attached to the distal end of the robot is replaced.

In the abovementioned aspect, the measurement target site may have an asymmetrical shape.

With this configuration, it is possible to recognize the shape of the measurement target site by scanning the measurement laser beam and measuring the distances to the measurement target site, and when doing so, it is also possible to recognize the rotation angle of the measurement target site in a simple manner.

In the abovementioned aspect, the measurement target site may be in the form of a plane.

With this configuration, the measurement target site can be made to have the simplest shape for computing the coordinate transformation function, thereby reducing the amount of computation.

In the abovementioned aspect, the measurement target site may include a shape recognizing portion at an asymmetrical position in a plane having a symmetrical shape.

With this configuration, even if the plane constituting the measurement target site has a symmetrical shape, the measurement target site can be made to have an asymmetrical shape by including the shape recognizing portion disposed at the asymmetrical position, and it is also possible to recognize the rotation angle of the measurement target site in a simple manner.

The invention claimed is:

1. A calibration method for a laser processing robot including a base that is fixed on an installation surface, a movable portion that is movable with respect to the base, and a laser processing tool that is mounted at a distal end of the movable portion and that has a distance measuring function by scanning a measurement laser beam, the laser processing robot having a robot coordinate system, said method comprising:
   fixing a measurement jig that includes a measurement target site having a prescribed shape to the base;
   storing a position and orientation of the measurement target site in the robot coordinate system as a first position and orientation that are determined by fixing the measurement jig to the base;
   placing the laser processing tool, by operating the movable portion, at a position where the measurement laser beam can be scanned with respect to the measurement target site and storing coordinates of a tool center point of the laser processing tool in the robot coordinate system;
   measuring distances between respective portions of the measurement target site and the tool center point by scanning the measurement laser beam at the measurement target site;
   calculating a position and orientation of the measurement target site in the robot coordinate system as a second position and orientation on the basis of the measured distances and a position of the tool center point in the robot coordinate system, the position of the tool center point being determined by the position at which the laser processing tool is placed;
   calculating a coordinate transformation function for converting the calculated second position and orientation into the stored first position and orientation of the measurement target site; and
   correcting the stored coordinates by using the calculated coordinate transformation function.

2. The calibration method for a laser processing robot according to claim 1, wherein the measurement target site has an asymmetrical shape.

3. The calibration method for a laser processing robot according to claim 1, wherein the measurement target site is in the form of a plane.

4. The calibration method for a laser processing robot according to claim 2, wherein the measurement target site includes a shape recognizing portion at an asymmetrical position in a plane having a symmetrical shape.

5. A robot system comprising:
a laser processing robot including a base that is fixed on an installation surface, a movable portion that is movable with respect to the base, and a laser processing tool that is mounted at a distal end of the movable portion and that has a distance measuring function by scanning a measurement laser beam, the laser processing robot having a robot coordinate system;
a controller that controls the laser processing robot; and
a measurement jig that includes a measurement target site having a prescribed shape and that is fixed to the base,
wherein the controller is configured to:
  store a position and orientation of the measurement target site in the robot coordinate system as a first position and orientation that are determined by fixing the measurement jig to the base;
  place the laser processing tool, by operating the movable portion, at a position where the measurement laser beam can be scanned with respect to the measurement target site and store coordinates of a tool center point of the laser processing tool in the robot coordinate system;
  measure distances between respective portions of the measurement target site and the tool center point by scanning the measurement laser beam at the measurement target site;
  calculate a position and orientation of the measurement target site in the robot coordinate system as a second position and orientation on the basis of the measured distances and a position of the tool center point in the robot coordinate system, the position of the tool center point being determined by the position at which the laser processing tool is placed;
  calculate a coordinate transformation function for converting the calculated second position and orientation into the stored first position and orientation; and
  correct the stored coordinates by using the calculated coordinate transformation function.

6. A laser processing robot comprising:
a base fixed to an installation surface, a movable portion that is movable with respect to the base, and a laser processing tool that is mounted at a distal end of the movable portion and that has a distance measuring laser configured to scan a measurement laser beam, the laser processing robot having a robot coordinate system;
a controller that controls the laser processing robot; and
a measurement jig that includes a measurement target site having a prescribed shape and that is fixed to the base,
wherein the controller is configured to:
  store a position and orientation of the measurement target site in the robot coordinate system as a first position and orientation that are determined by fixing the measurement jig to the base;
  place the laser processing tool, by operating the movable portion, at a position where the measurement laser beam can be scanned with respect to the measurement target site, and store coordinates of a tool center point of the laser processing tool in the robot coordinate system;
  measure distances between respective portions of the measurement target site and the tool center point by scanning the measurement laser beam with the distance measuring laser at the measurement target site;
  calculate a position and orientation of the measurement target site in the robot coordinate system as a second position and orientation on the basis of the measured distances and a position of the tool center point in the robot coordinate system, the position of the tool center point being determined by the position at which the laser processing tool is placed;
  calculate a coordinate transformation function for converting the calculated second position and orientation into the stored first position and orientation; and
  correct the stored coordinates by using the calculated coordinate transformation function.

* * * * *